United States Patent [19]

Bowen et al.

[11] Patent Number: 4,929,325
[45] Date of Patent: May 29, 1990

[54] REMOVABLE PROTECTIVE ELECTRODE IN A BIPOLAR BATTERY

[75] Inventors: Gerald K. Bowen, Cedarburg; Jeffrey P. Zagrodnik, Hales Corners, both of Wis.

[73] Assignee: Globe-Union Inc., Milwaukee, Wis.

[21] Appl. No.: 241,714

[22] Filed: Sep. 8, 1988

[51] Int. Cl.⁵ .......................... H01M 8/24; C25B 9/00
[52] U.S. Cl. .................................. 204/268; 204/269; 429/18
[58] Field of Search .................. 429/18, 34, 110, 101; 204/267, 268, 269, 228

[56] References Cited

U.S. PATENT DOCUMENTS

| | | | |
|---|---|---|---|
| 4,197,169 | 4/1980 | Zahn et al. | 429/18 X |
| 4,277,317 | 7/1981 | Grimes et al. | 429/18 X |
| 4,285,794 | 8/1981 | Bellows et al. | 429/101 X |
| 4,312,735 | 1/1982 | Grimes et al. | 429/18 X |

Primary Examiner—Anthony Skapars
Attorney, Agent, or Firm—Foley & Lardner

[57] ABSTRACT

A removable electrode protective assembly for use in a bipolar battery having common aqueous electrolyte-carrying manifolds. The protective assembly is in electrical communication with the electrolyte contained in a plurality of shunt tunnels extending through the battery and is easily removable from the battery to provide easy access to the various components of the assembly.

13 Claims, 2 Drawing Sheets

REMOVABLE PROTECTIVE ELECTRODE IN A BIPOLAR BATTERY

BACKGROUND OF THE INVENTION

This invention relates to bipolar batteries of the zinc-bromine type and, more particularly, to bipolar batteries of the zinc-bromine type having shunt current protection systems.

Bipolar electrochemical flow battery systems are well known. See, for example, U.S. Ser. No. 189,363 entitled "Terminal Electrode" filed May 2, 1988 by J. Zagrodnik and G. Bowen, the disclosure of which is hereby incorporated by reference.

Numerous techniques have been developed to reduce or minimize the undesirable side effects caused by the occurrence of bypass or the so-called "shunt currents" occuring in bipolar batteries wherein aqueous anolyte and catholyte are fed by manifolds to the various respective cells in a bipolar battery. Shunt currents occur as a result of the current seeking other conductive passages such as the manifolds used to feed the aqueous anolyte and catholyte in addition to the desired passage through the series connected cells. An undesirable side effect is the poor distribution of zinc causing poor battery performance or shortened battery life.

A particularly interesting technique for reducing shunt currents is embodied in the description of U.S. Pat. No. 4,197,169 issued to Zahn et al. on Apr. 8, 1980 in which a protective electric current is induced in the manifolds which carry the liquid electrolyte to the bipolar cells. In U.S. Pat. No. 4,279,732 issued to Bellows et al. on July 21, 1981, the electrodes providing the protective current, i.e., "protective electrodes", are made annular in shape about the manifolds providing a substantially uniform current density profile through the electrolyte manifold but does not impede the electrolyte flow itself.

U.S. Pat. No. 4,285,794 issued to Bellows et al. on Aug. 25, 1981 is directed toward the structure of the protective electrodes in a system for reducing shunt currents in zinc-bromine type bipolar batteries. Specifically, the annular negative electrodes have an outer sleeve and an inner porous liner. The outer sleeve is fed a bromine-rich electrolyte for the purpose of supplying the electrolyte flowing through the electrode with bromine but the inner porous sleeve does not permit the bromine-rich electrolyte itself to mix with the electrolyte. The liner, however, does permit the passage of ionic currents at low resistance.

U.S. Pat. No. 4,277,317 issued to Grimes et al. on July 7, 1981 describes the reduction of shunt currents in a bipolar battery by interconnecting the electrolyte channels (which communicate with the manifolds) that provide electrolyte to the cells with connecting tunnels. A protective current is formed along the tunnels and is supplied by an external source or the terminal cells of the battery itself. As described in U.S. Pat. No. 4,312,735, to Grimes et al., issued on June 26, 1982, power consumption of the tunnels is further reduced by tapering the tunnels so as to provide a smaller cross-section —and a higher electrical resistance—at the midpoint of the tunnels.

A typical construction of a bipolar battery of the zinc-bromine type is embodied in a unitary structure having a thermoplastic box-like frame in which an assembly of conductive substrates are positioned adjacent thin microporous separators having electrolyte channels embossed thereupon. The substrates alternate being coated with positive and negative materials. The entire assembly is tightly fitted within the external frame and sealed together. A plurality of manifold tunnels extending through the entire frame and assembly connect the aqueous catholyte and anolyte reservoirs to the proper catholyte and anolyte channels. Pumps supply the proper flow to the liquids. Each of the end blocks of the frame is provided with an external terminal lug which is electrically connected to the terminal electrodes within the frame. Additionally, a plurality of anodic and cathodic shunt tunnels interconnecting the respective channels extend from one end block to another. Protective negative and positive electrodes are positioned on the end blocks and are electrically connected to the shunt tunnels as described in the aforementioned U.S. Pat. No. 4,277,367 to Grimes, et. al. As stated in the aforementioned U.S. Pat. No. 4,312,335, the tunnels may be tapered to reduce power consumption.

Because of the build-up of zinc dendritic material and corrosive effects of the bromine, it is desirable that the protective electrodes and associated components be easily and quickly replaced at appropriate intervals. None of the references cited above, however, provide for or teach the removal and replacement of the protective electrodes in an economic and expedient manner.

SUMMARY OF THE INVENTION

A bipolar battery having common aqueous electrolyte carrying manifolds is provided with a shunt current protection system comprising a first pair of shunt tunnels respectively communicating with the aqueous anolyte and catholyte at the inlet side of the channels communcating with the manifolds and a second pair of shunt tunnels respectively communicating with the aqueous anolyte and catholyte at the outlet side of the channels. A plurality of protective electrodes in electrical communication with the electrolyte within the shunt tunnels are positioned in the end blocks. Each protective electrode includes a member adapted to electrically contact an external electrical current source and a device for removably securing the member to its respective end block.

BRIEF DESCRIPTION OF THE DRAWINGS

Exemplary embodiments of the protective electrode assembly of the present invention will hereinafter be described in conjunction with the appended drawing, wherein like designations denote like elements; and.

DETAILED DESCRIPTION OF THE PREFERRED EMBODIMENT

Figure 1:
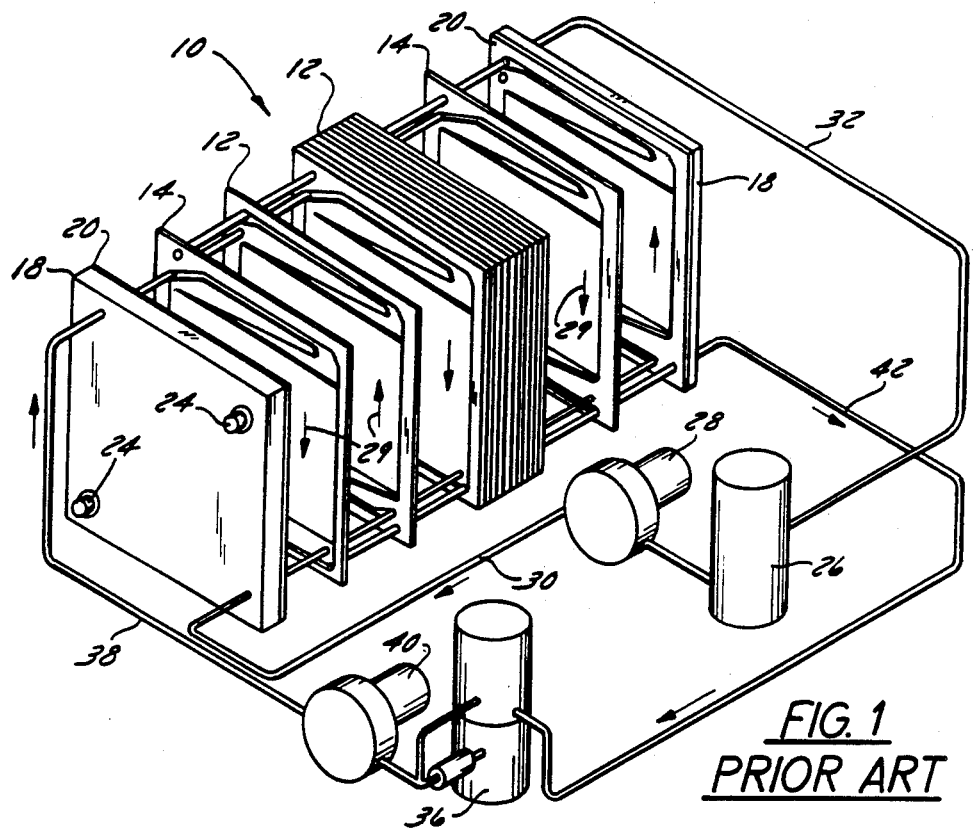
FIG. 1 is an exploded schematic perspective view of a bipolar battery illustrating a plurality of cells separated by separators and an external view of the protective electrodes in accordance with one embodiment of the present invention.

Reference is made to the prior art bipolar battery of FIG. 1, in which character numeral 10 generally denotes a bipolar flow battery having a plurality of alternating separators 14 and electrodes 12. Disposed on one side of each electrode 12 is an anode half cell and on the opposite side a cathode half cell. The separators 14 and electrodes 12 may be friction welded together to form a sealed stack of cells. At each end of the battery is disposed an end block 18 appropriately abutting a terminal electrode 20, and a extends through end block 18. At opposite diagonal corners of end block 18 are located protective electrodes 24.

A pumping system provides the aqueous anolyte and catholyte complex to the respective anode and cathode half cells. For example, the aqueous anolyte is located in reservoir 26 and is fed through anolyte pump 28 through manifold 30 to a pattern of long, winding anolyte inlet and outlet channels which may be incorporated into one or both sides of separator 14 and electrodes 12. Anolyte moves across the faces of anode half cells as shown by arrows 29 and into return manifold 32, finally returning to reservoir 26. In a similar fashion, the aqueous catholyte complex located in the lower half of reservoir 36 is fed to manifold 38 via pump 40 to the patterns of channels formed on the faces of separator 14 and the cathode half cells of electrodes. The aqueous catholyte then moves into return manifold 42 and is returned to reservoir 36. Contemporaneously and commonly filed application Ser. No. 247,035 (assigned to the same assignee as the present application) describes in detail the structure of such channels, and is incorporated herein by way of reference.

Shunt currents are a common phenomena in batteries consisting of a series connection of cells which have a common conductive electrolyte such as the one discussed in reference to FIG. 1. The potential difference between the cells induces current to flow through the electrolyte flow channels from cells of higher potential to cells of lower potential, thus their value is zero when the battery voltage is zero but they get progressively higher as the battery voltage increases. These shunt currents produce two negative effects: (1) the shunt currents are parasitic to the battery, and (2) a maldistribution of zinc occurs which is detrimental to both battery performance and life.

When shunt currents flow between cells, electrons are consumed at the higher potential cells. This occurs through the plating of zinc ($Zn^{++} + 2e^- \rightarrow Zn^0$) at the anodes or the dissolution of bromine ($Br_2 + 2e^- \rightarrow 2Br^-$) at the cathodes. The current is then carried ionically through the electrolyte channel, into the manifold, such as manifolds 30, 32, 38 and 42, and through the electrolyte channels of adjacent lower potential cells. At the electrode surfaces of the lower potential cells, electrons are generated. This occurs through the dissolution of zinc ($Zn^0 \rightarrow Zn^{++} + 2e^-$) at the anodes or the formation of bromine ($2Br^- \rightarrow Br_2 + 2e^-$) at the cathodes.

The shunt current reactions occurring at the cathodes is not harmful since bromine is normally flushed from the stack and resupplied to the cells as needed for discharge. However, the net result of the anode shunt current reactions is that zinc is removed from the low potential side of the stack and redistributed to the high potential side of the stack. This results in a nonuniform performance of the cells which is detrimental to overall battery performance. Furthermore, the replating of zinc at the high potential anodes will occur preferentially at the closest point at which the electrode contacts the incoming electrolyte channels. As a result, zinc tends to plate from the edge of the electrode into the electrolyte flow channels. Eventually this will cause blockage of the flow channels, restricting electrolyte flow, and causing battery failure.

The shunt current protection system (SCP) does not reduce the parasitic draw on the battery. In fact, a slightly higher parasitic loss is required for protected systems than for systems in which the shunt currents are allowed to occur. However, by eliminating the flow of shunt currents, the SCP system eliminates the catastrophic failure mechanism of dendritic zinc plating into the flow channels, as well as the performance decline associated with the lack of a uniform zinc distribution from cell to cell.

The cells in a bipolar zinc/bromine battery are in electrical contact with one another through four common electrolyte paths, namely, the anolyte inlets and outlets and the catholyte inlets and outlets. Thus, the SCP system must prevent current from flowing through any of these pathways to be successful.

Figure 2:
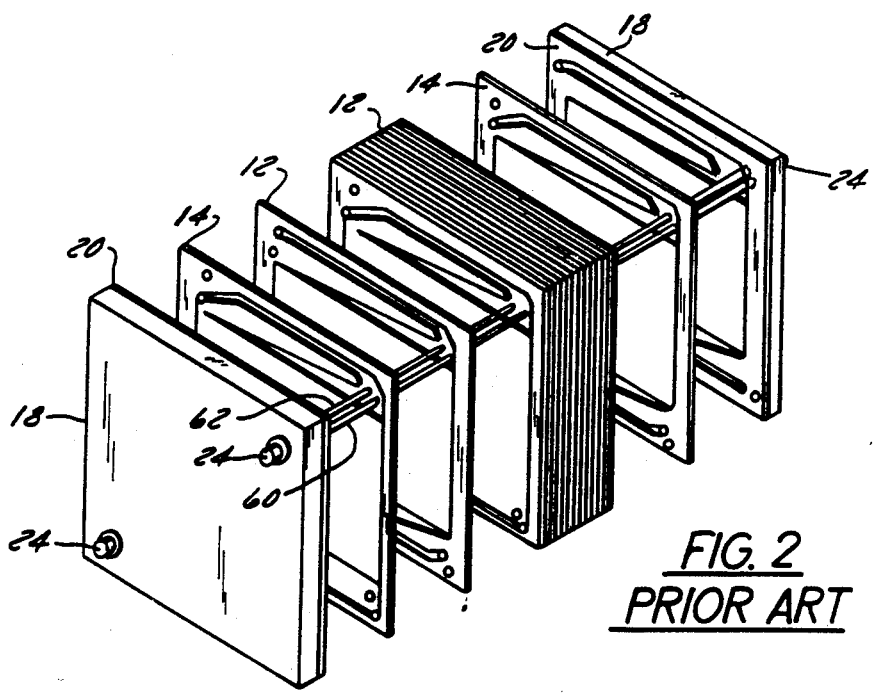
FIG. 2 is an exploded schematic perspective of a bipolar battery as illustrated in FIG. 1 excluding the manifolds, pump reservoir assemblies, and protective electrodes, and including one pair of the shunt tunnels.

To accomplish the elimination or reduction of current from flowing through the manifold passageways, the shunt current protection system is provided involving four tunnels, two of which are shown in FIG. 2 as tunnels 60 and 62. For clarity, the anolyte and catholyte manifolds illustrated in FIG. 1 are shown only as intersections as is the other pair of shunt tunnels. Each tunnel 60 and 62 corresponds to one of the four electrolyte pathways for shunt currents as discussed above and runs essentially perpendicular to the electrolyte channels on the surfaces of the separator and electrodes. The intersection of tunnels and channels occur at a point close to the electrode surface. A protective electrode 24 (as shown in FIG. 1) is placed at both ends of tunnels 60 and 62 in end blocks 18. The required number of electrodes can be eight, but may also be as small as four as described below.

The SCP electrodes are connected to the battery terminals at their respective ends of the battery stack. Thus, the potential across the SCP electrode pairs is the same as the potential of the battery at all times. The potential between the SCP electrode pairs induces a current to flow through the tunnels. The level of the current depends on the resistance of the electrolyte which fills the tunnel. Since the electrolyte resistance is the same throughout the tunnel, a uniform voltage gradient is established from one end of the tunnel to the other. This voltage gradient will closely approximate the voltage gradient along the series connection of electrodes in the battery stack. As a result, the voltage at each intersection between the tunnel and the electrolyte channel is forced to be equivalent to the voltage of the electrode itself. As a result, no potential exists between the electrode surfaces and the electrolyte at the intersection, and thus no shunt currents flow.

The description given above is simplified in that it assumes that the protective current flows directly through the tunnel from one SCP electrode to the other. In reality, some of the protective current will itself flow through the electrolyte channels, into the manifold, and back down the electrolyte channels of adjacent cells to rejoin the tunnel current. This causes the protective current in the tunnels to be highest at each end of the stack, to decrease through the tunnel to the center of the stack, and then to increase again to the opposite end of the stack. The protective current entering one end of the tunnel equals that leaving the other end.

The net effect of this variation in current level throughout the tunnel would be a nonuniform voltage gradient through the tunnel if the tunnel were of uniform diameter and thus of uniform resistance. This would lead to a mismatch between the electrode cell voltage and the tunnel voltage, and a potential would still exist for shunt currents to flow. To avoid this problem, the tunnels are tapered in a predetermined manner. The tunnel is larger on each end and gets progressively smaller toward the center of the stack. Thus, the resistance of the tunnel is lowest at each end of the stack and gets progressively higher toward the center of the stack. The resistance variation is designed to offset the variation in tunnel protective current according to Ohm's law, and thus maintain the uniform voltage gradient through the tunnel.

The passage of some of the protective current through the electrolyte channels is not harmful since it involves only ionic current flow and thus no detrimental zinc plating is involved. However, plating can occur at the solid interfaces between the tunnels and the protective electrodes. At the low potential side of the stack the normal reactions at the ends of the anolyte and catholyte tunnels, respectively, would be:

$$Zn^0 \rightarrow Zn^{++} + 2e^- \text{ and } 2Br^- \rightarrow Br_2 + 2e^-.$$

However, since no zinc metal exists at the SCP electrode, the bromide to bromine reaction replaces the zinc reaction for the anolyte tunnel. At the high potential side of the stack, the normal reactions at the ends of the anolyte and catholyte tunnels, respectively, would be:

$$Zn^{++} + 2e^- \rightarrow Zn^0 \text{ and } Br_2 + 2e^- 2Br^-$$

The zinc plating reaction can be detrimental in the same manner as discussed for shunt currents. Zinc will plate onto the SCP electrode surface and eventually through the tunnel and back into the electrolyte channels. This can short out the SCP electrode pairs and disrupt the electrolyte flow. To avoid these problems, catholyte containing bromine is supplied to the face of the SCP electrode at the high potential side of the anolyte tunnels. The bromine reaction will then occur preferentially to the zinc plating reaction and these problems are avoided.

Figure 3:
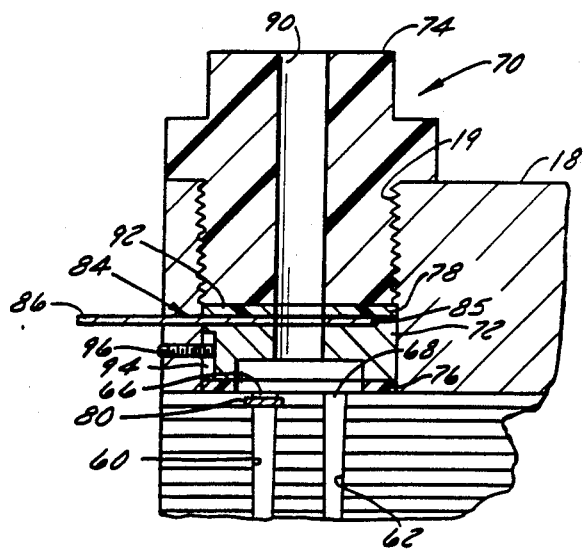
FIG. 3 is a side sectional view of a protective anode electrode assembly and a portion of the adjacent battery in accordance with one embodiment of the present invention.

As discussed before, the protective electrode assembly in accordance with the present invention is easily removable and replaceable. The protective electrode assembly is employed at both ends of the battery in bores in the end block facilitating easy and quick removal in contrast to those heretofore used. To illustrate this reference is made to FIG. 3 and end block 18 at the high potential side of the battery wherein end block 18 is provided with a bore 19 suitably threaded for receiving a protective electrode assembly 70. Assembly 70 comprises an annular supply fitting 74 of a non-conducting material positioned in bore 19 bearing against annular protective electrode 72 made of a conductive material such as graphite. The opening in electrode 72 circumscribes the openings 66, 68 of tunnels 60 and 62 and is tightly held against gasket 76 by fitting 74 which is threadably engaged with the internal threads of bore 19. A second annular gasket 78 may be placed between the abutting interfaces of electrode 72 and supply fitting 74.

Anode tunnel 60 is sealed by a separator disc 80 anode of any material which has a low resistance to ionic transfer, but prevents the bromine containing catholyte from entering tunnel 60. An example of such a material may be a submicroporous material marketed under the tradename of Daramic and available from W. R. Grace Company. The aqueous catholyte is tapped from the catholyte manifold. Separator discs 80 are needed only to seal the anolyte tunnels at anode end, i.e. high potential ends, and are not necessary for catholyte tunnels.

Figure 3A:
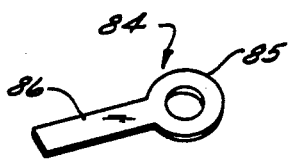
FIG. 3a is a top plan view of a metal contactor employed with the embodiment shown in FIG. 3.

A metal contactor 84 is positioned against the protective electrode 72 and functions to supply and remove current from electrode 72. As illustrated in FIG. 3A, contactor 84 is in the shape of an annular ring 85 and a tab 86 which extends through a small hole in the edge of end block 18. External electrical connection is made to tab 86.

The catholyte or catholyte complex phase may be tapped off by a small line at the outlet of pump 40 and is supplied to protective electrode 72 through an appropriate opening 90 in supply fitting 74. The catholyte thus flows through fitting 74, past contactor 84, through protective electrode 72, impinges against separator disc 80 and into tunnel 60. Because of the reactive nature of the catholyte, it is preferable that contactor 84 made of an inert material such as titanium or, alternatively, ensuring that gasket 76 overlaps the inside edge of the annular portion of contactor 84 to prevent the inside edge of contactor 84 from being exposed to the aqueous catholyte.

Figure 3B:
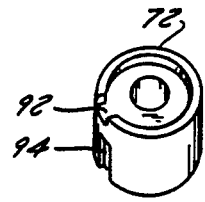
FIG. 3b is a perspective view of a protective electrode employed with the embodiment shown in FIG. 3.

When fitting 74 is screwed into bore 19, the pressure exerted against contactor 84 tends to cause it to rotate with fitting 74. Unless made of resistive material, tab 86 would have a propensity to shear. To prevent shearing, electrode 72 is designed with an indentation or locking groove 92 as shown in FIG. 3B which allows a locking relationship with tab 86. Additionally, electrode 72 is provided with a longitudinal groove 94. A threaded locking pin 96 is inserted through a threaded opening in end wall 18 and bears against electrode 72 within groove 94 preventing electrode 72 from rotating with fitting 74 when being tightened.

Figure 4:
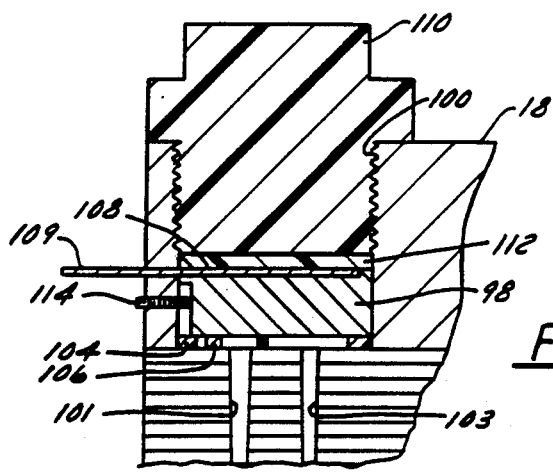
FIG. 4 is a side sectional view showing a protective cathode electrode assembly and a portion of the adjacent battery in accordance with the embodiment of the invention.

Protective electrodes on the cathode side of battery may be comprised of a solid fitting and solid members with indentations and grooves for respective use with contactors and locking pins. Solid cylindrical fittings are appropriate since there is no necessity for aqueous catholyte flow through the protective electrode. A removable assembly of the solid type is depicted in FIG. 4. Protective electrode 98 is positioned at the bottom of bore 100 in end wall 18 and against an annular gasket 104 which circumscribes tunnels 101, 103. While no separator disk is required at the end of the anolyte tunnels, small annular gasket 106 is preferably used to prevent crossflow between tunnels. Contactor 108 is placed in contact with electrode 98 and tab 109 extends externally of the assembly. Solid fitting 110 is screwed into bore 19 and bears against removable electrode 98 via gasket member 112. As before, other removable protective electrode 98 and contactor 108 may be restrained against rotation by vertical set screw 114 which contacts a groove in the side wall of electrode 98.

Alternatively, however, the protective electrode (cathode) assembly used above may be constructed identically to the protective anode assembly. To accomplish this, it would be necessary to return the catholyte to the reservoir 36 via a small tube attached to the opening in supply fitting 110. Still another alternative would be to use the solid structure of the cathode protective assembly illustrated in FIG. 4 at all locations. To ensure a supply of catholyte, channels cut through from the terminal electrode to the end separators would be needed. In each alternative, however, the advantage of replaceable protective electrode assemblies would still be preserved.

It will be understood that the foregoing description is of a preferred exemplary embodiment of the present invention and that the invention is not limited to the specific forms shown. Modifications may be made in design and arrangement thereof within the scope of the present invention, as expressed in the appended claims.

We claim:

1. An electrode protective assembly for use in a bipolar battery having a plurality of electrodes, each with an anodic surface and a cathodic surface with each electrode being separated by an ionic penetratable separator, said electrodes positioned between end blocks, at least one pair of tunnels adapted to respectively carry aqueous anolyte and catholyte to respective anodic and cathodic surfaces and a corresponding number of shunt tunnels extending from one end block to the other and adapted to carry aqueous anolyte and catholyte, said assembly including:
    means removably positioned in a bore of one of said end blocks for electrically contacting an electric current source and said aqueous anolyte and catholyte in said shunt tunnels, and
    means for removably securing said electrically contacting means in said bore of said one end block.

2. The assembly of claim 1 in which said electrically contacting means is positioned in said one wall located adjacent an anode terminal electrode, said electrically contacting means comprising an annular member in a sealed tight relationship around the ends of said shunt tunnels and means for sealing an end of one of said tunnels carrying aqueous anolyte, said sealing means being permeable to ionic conduction.

3. The assembly of claim 2 including an annular conducting member abutting said removably positioned means, said member including an element extending exteriorly of said one end block and adapted to be in electrical contact with a terminal of said battery.

4. The assembly of claim 3 including locking means for releasably securing said removably positioned means in said bore against rotational movement.

5. The assembly of claim 4 wherein said locking means includes a locking pin adapted to be inserted in a threaded hole in said one end block and a longitudinal groove on the outer surface of said removably positioned means.

6. The assembly of claim 1 in which said removably positioned means is a substantially cylindrical member in a sealed tight relationship against the ends of said tunnels, said removably securing means being threadably engaged with threads in the wall of said bore and abutting said removably positioned means.

7. The assembly according to claim 6 in which means for releasably securing is an annularly shaped member.

8. The assembly of claim 6 in which said cylindrical member is provided with a longitudinal groove and said one end wall is provided with a threaded hole adapted to receive a threaded locking pin for abutment of said cylindrical member along said groove.

9. The assembly of claim 8 including electrical contacting member adapted to sit against said cylindrical member and having an element extending exteriorly of said one end block and adapted to be in electrical contact with a terminal of said battery.

10. An electrode protective assembly for use in a bipolar battery having a plurality of electrodes, each with an anodic surface and a cathodic surface with each electrode being separated by an ionic expenetratable separator, said electrodes positioned between end blocks, at least one pair of tunnels adapted to respectively carry aqueous anolyte and catholyte to respective anodic and cathodic surfaces and a corresponding number of shunt tunnels extending from one end block to the other and adapted to carry aqueous anolyte and catholyte, including:
    a bore in one of said end blocks communicating with the ends of said shunt tunnels,
    an electrically conducting member positioned in said bore adjacent to said ends of said tunnels and electrically communicating with the aqueous anolyte and catholyte contained therein,
    electrically conducting element positioned against said member and extending exteriorly of said one end block, and
    means positioned in said bore for releasably securing said electrically conducting member in place.

11. The assembly of claim 10 in which said member is annular, substantially cylindrical in shape, and circumscribes said ends of said shunt tunnels in a liquid tight seal relationship, said maintaining means being annular with the annular opening therein communicating with the annular opening in said member.

12. In a bipolar battery having a pair of end plates and a plurality of bipolar cells with a cathode sides and anode sides positioned therebetween,
    a pair of first manifolds for respectively providing inlet channels through which respective aqueous anolyte and catholyte are pumped to said cells, and
    a pair of second manifolds for respectively providing outlet channels through which the respective aqueous anolyte and catholyte are returned to a respective pair of reservoirs,
    a shunt current protection system comprising a first pair of juxtaposed shunt tunnels through each of said cells and termination with ends adjacent said end blocks,
    one of said tunnels being in aqueous communication with said aqueous catholyte at each of said cathode sides of said cells and the other of said pair of tunnels being in aqueous communication with said aqueous anolyte at each of said anode sides of said cells,
    a second pair of juxtaposed anolyte and catholyte shunt tunnels each being in respective aqueous communication with said aqueous catholyte and anolyte for returning said respective aqueous catholyte and anolyte to said respective reservoirs,
    at least two pairs of protective electrode assemblies respectively positioned near the ends of said first pair of juxtaposed tunnels, said protective assembly comprising a first means within said end plate electrically contacting aqueous anolyte and catholyte in said juxtaposed tunnels and a second means for releasably securing said first means within said end plate.

13. The shunt current protection system of claim 12 including an ionic permeable means for sealing the end of said anolyte shunt tunnel of claim 12, and where said first means is annular member circumscribing said ends of said tunnels and providing a passageway communicating with said catholyte shunt tunnel.

* * * * *